(12) United States Patent
Dunn

(10) Patent No.: US 6,250,431 B1
(45) Date of Patent: Jun. 26, 2001

(54) METHOD OF RETAINING A MINIMUM RUNNING CLEARANCE BETWEEN A ROTOR AND FRICTION PADS

(75) Inventor: Michael E. Dunn, Canton, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/515,771

(22) Filed: Mar. 1, 2000

(51) Int. Cl.[7] ....................................... B60T 1/06
(52) U.S. Cl. ................... 188/18 A; 188/218 XL; 301/6.1; 384/512; 384/571
(58) Field of Search ........................ 188/18 A, 218 XL, 188/18 R, 17, 72.3; 301/6.1, 6.8, 35.62, 105.1, 111; 384/504, 505, 506, 512, 564, 571

(56) References Cited

U.S. PATENT DOCUMENTS

| | | | |
|---|---|---|---|
| 5,842,388 | * 12/1998 | Visser et al. | 82/1.11 |
| 5,882,123 | * 3/1999 | Lee et al. | 384/569 |
| 5,884,980 | * 3/1999 | Visser et al. | 301/6.1 |
| 5,937,499 | * 8/1999 | Austin et al. | 29/434 |

* cited by examiner

Primary Examiner—Douglas C. Butler
Assistant Examiner—Pamela J. Rodriguez
(74) Attorney, Agent, or Firm—Leo H. McCormick, Jr.; Warren Comstock

(57) ABSTRACT

A method to retain a minimum running clearance between the friction pads associated with a caliper of a brake and a rotor attached to a wheel of a vehicle. A bearing member associated with the wheel includes a plurality of rollers which axially move about a reference point to allow the rotor to correspondingly move and retract the friction pads of the caliper when the vehicle is subjected to centrifugal forces. This retraction of the friction pads by movement of the rotor creates a minimum running clearance between the rotor and friction pads on termination of the radial forces. A desired running clearance is reestablished during a brake application.

3 Claims, 4 Drawing Sheets

METHOD OF RETAINING A MINIMUM RUNNING CLEARANCE BETWEEN A ROTOR AND FRICTION PADS

This invention relates to a wheel and bearing assembly whereby a minimum running clearance is retained between brake friction pads and a rotor in a brake system after a vehicle experiences centrifugal forces by utilizing a built-in end clearance in a bearing member.

BACKGROUND OF THE INVENTION

In vehicles it is a usual practice to position a wheel assembly on a bearing member located on an axle. The bearings member is designed to allow the wheel assembly to freely rotate on the axle while at the same time a rotor attached to the wheel assembly is positioned in a radial plane between friction pads of a caliper brake. A bearing member includes a plurality of rollers having a cylindrical shape or a tapered shape as disclosed in U.S. Pat. No. 5,882,123. The plurality of rollers are usually aligned in first and second rows between an outer race and an inner race. The plurality of rollers are positioned and retained in engagement with engagement surfaces on an outer race member and inner cones by trust surfaces. If the engagement with a trust surface creates too large of a retaining force on the rollers, the wheel will not rotate in a smooth manner as binding or drag occurs. Conversely, if a trust surface does not exert a sufficient retaining force on the rollers when a wheel rotates and is subjected to lateral forces it is possible to create a unstable or shimmy motion in a wheel assembly. Thus, it is desirable to position and retain the first and second rows of rollers in a bearing member in a fixed location symmetrical about a reference plane.

The bearings of as described above, which are currently in use for vehicles locate a wheel assembly on an axle and position a rotor with respect to friction pads of a caliper brake. In such vehicles, the rotor and friction pads of a caliper brake have a predetermined running clearance in order to prevent unwanted engagement that could produce additional resistance to rotation of the wheel. Unfortunately, vehicles do not always move in a linear and horizontal direction but are often subjected to centrifugal forces as when turning or negotiating curves. The centrifugal forces can often move a rotor attached to a wheel assembly into engagement with a corresponding friction pad in the caliper to essentially eliminate a running clearance between a friction pad and rotor. On termination of the centrifugal force and a return to linear and horizontal movement, should a vehicle now experience any vibratory force, the rotor and friction pad may momentarily engage each other in a manner whereby over a period of time the surface of the rotor is polished. It is possible for such polishing to distort the surfaces of a rotor to an extent that the coefficient of friction between the friction pads and rotor change and as a result surging may occur during a brake application. It should be noted that the polishing of a rotor as described above is limited to those instances when a vehicle travels for an extended period of time without an operator effecting a brake application as running clearances between the friction pads and rotor are automatically re-set through a brake application.

SUMMARY OF THE INVENTION

A primary object of the present invention is to provide a wheel and bearing assembly for a vehicle whereby a minimum running clearance is retained between a rotor secured to a wheel and friction pads carried by a caliper of a brake system after a vehicle encounters centrifugal forces prior to an operator effecting a brake application.

In more particular detail, in the present invention a bearing member is selected from a source which has a first plurality of rollers and a second plurality of rollers retained by first and second cones in a unitary outer race with preset built-in end play. The first and second cones are located on a hub of a wheel assembly with the first cone engaging a first shoulder on the hub. The hub is placed on an axle shaft of the vehicle with the second cone engaging a second shoulder on the axle shaft. The wheel assembly is secured to the axle by fasteners to hold the first and second cone members securely against the first and second shoulders. Thereafter, the unitary outer race of the bearing member is fixed to the vehicle and a rotor, which has a first peripheral face and a second peripheral face, is attached to the wheel assembly. A caliper brake is secured to the vehicle such that first and second friction disc carried by the caliper brake is aligned with the first and second peripheral faces on the rotor. The caliper brake, includes retraction structure such that a predetermined running clearance is set between the rotor and the first and second friction disc after each brake application. When the wheel assembly rotates during linear horizontal movement of the vehicle, the first plurality of rollers engage a first tapered or sloping raceway in the outer race and the second plurality of rollers engage a second tapered or sloping raceway in the outer race symmetrically with respect to a reference point such that the rotor is located in a radial plane with respect to the first and second friction disc with a desired running clearance. When the wheel assembly is subject to centrifugal forces the first and second plurality of rollers shift engagement along the first and second tapered or sloping raceways a distance corresponding to the built-in end play. This axial movement is magnified and as a result the rotor correspondingly moves friction disc to increase the running clearance a distance "y". When the centrifugal forces terminate, the first and second plurality of rollers return to their symmetrical positions on the tapered or sloping surface on the outer race with continued horizontal linear movement of the vehicle. The first and second friction pads remain stationary and thus the movement created by the engagement with the rotor as a result the end play assures a minimum running clearance "y" is present until a brake application reestablished the desired running clearance "f".

An advantage of this invention resides in the creation of a minimum running clearance "y" between a rotor and friction pads after a vehicle is subjected to centrifugal forces when a vehicle thereafter moves in a linear direction for an extended period of time prior to an operator instituting a brake application.

A further advantage of the brake system of this invention resides in the setting of a minimum running clearance through the selection of a bearing member having built-in end play.

DETAILED DESCRIPTION

Figure 1:
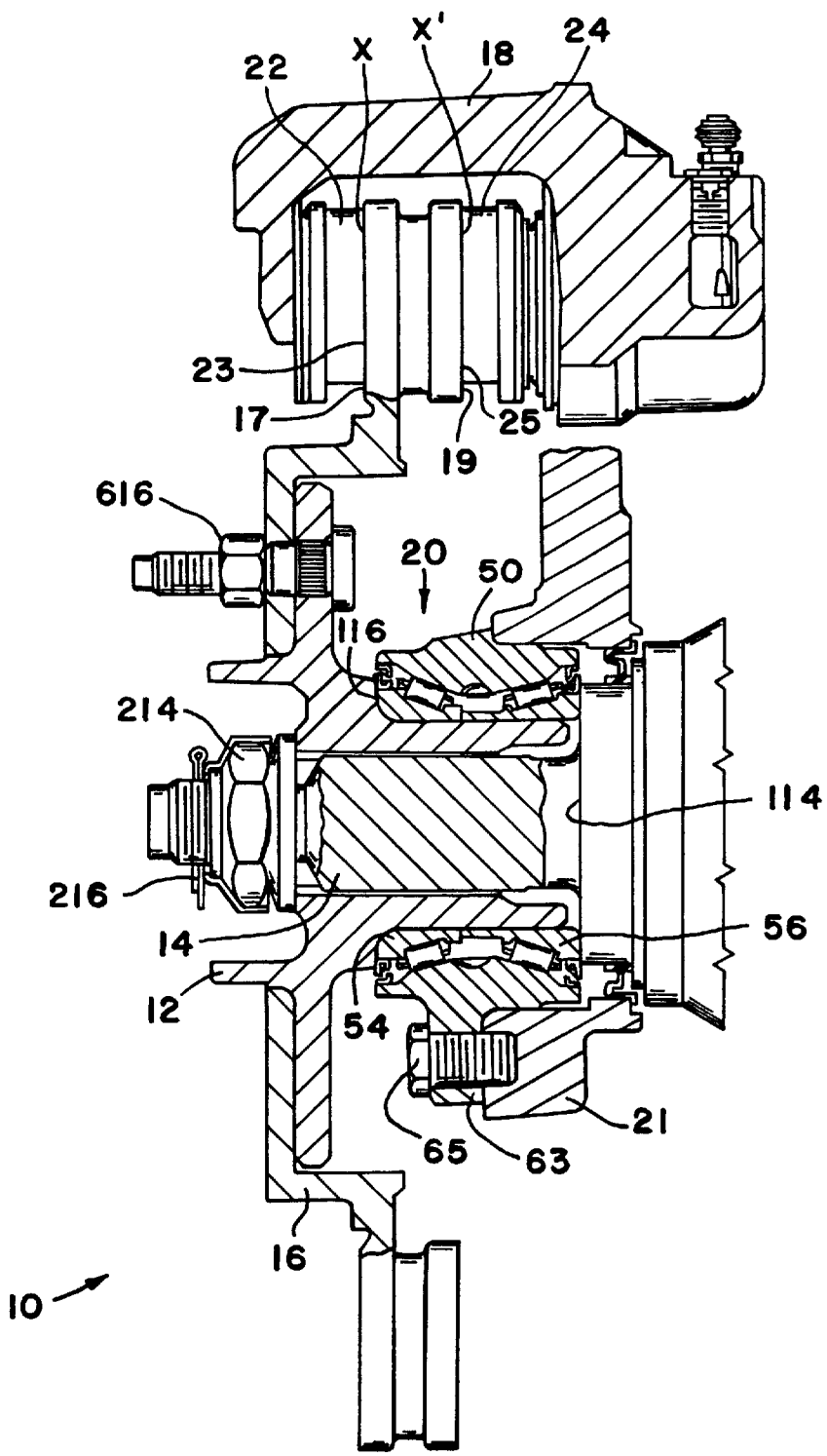
FIG. 1 is a schematic illustration of a wheel and bearing assembly according to the present invention whereby a minimum running clearance is always maintained between a rotor and friction pad in a brake system.

The wheel and bearing assembly 10 for a vehicle, shown in FIG. 1 is a schematic illustration of the present invention and includes a hub 12 retained on an axle 14, a rotor 16, a caliper brake 18 and a bearing member 20. A wheel, not shown, which is attached to the hub 12 rotates when the vehicle is moving and correspondingly the rotor 16 rotates with respect to first 22 and second 24 friction pads carried by the caliper brake 18. The caliper brake 18 is activated by hydraulic fluid being supplied to caliper brake 18 in response to an operator desiring to effect a brake application. The hydraulic fluid supplied to the caliper brake 18 moves the first 22 and second 24 friction pads into engagement with the rotor 16 to effect a brake application. When the communication of hydraulic pressure terminates, the first 22 and second 24 friction pads retract away from the rotor 16 to create a desired running clearance "x" between the face 23 on friction pad 22 and face 25 on friction pad 24 and corresponding faces 17 and 19 on rotor 16. This clearance "x" is important as inadvertent engagement between the friction pads 22 and 24 and rotor 16 can cause polishing of faces 17 and 19 which can eventually effect the resulting coefficient of friction between these components and the smooth operation of the brake system.

While the running clearance "x" is automatically set after each brake application, the running clearance x can be reduced or eliminated prior to the resetting as when the components react in a different manner as a result of centrifugal force acting on the vehicle and wheel assembly.

In more particular detail, the present invention provides a method to attenuate the engagement of friction pads 22, 24 carried by caliper 18 of a brake system for a vehicle in between brake applications. The structure for achieving this method is primarily achieved through the structure of the bearing member 20.

Figure 2:
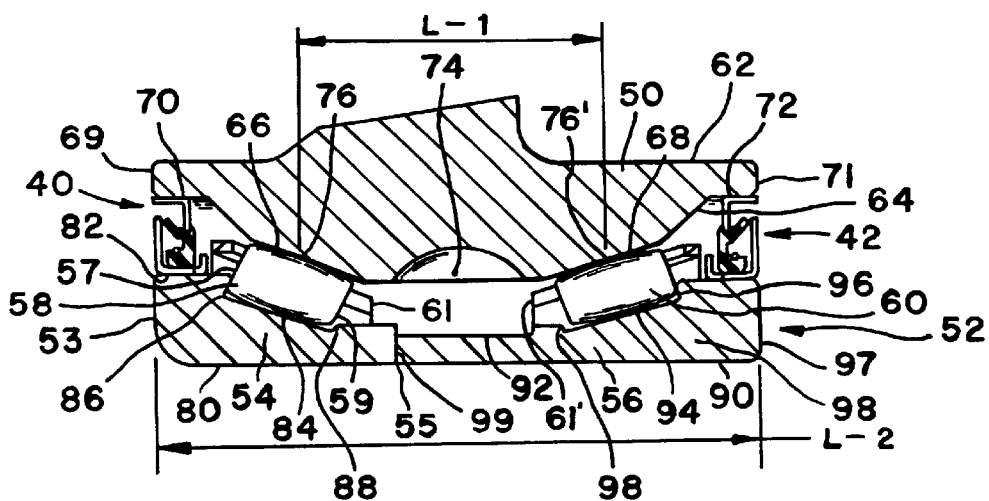
FIG. 2 is an enlarged sectional view of the bearing member of FIG. 1 illustrating the relationship of the components therein with built-in end play.
Figure 3:
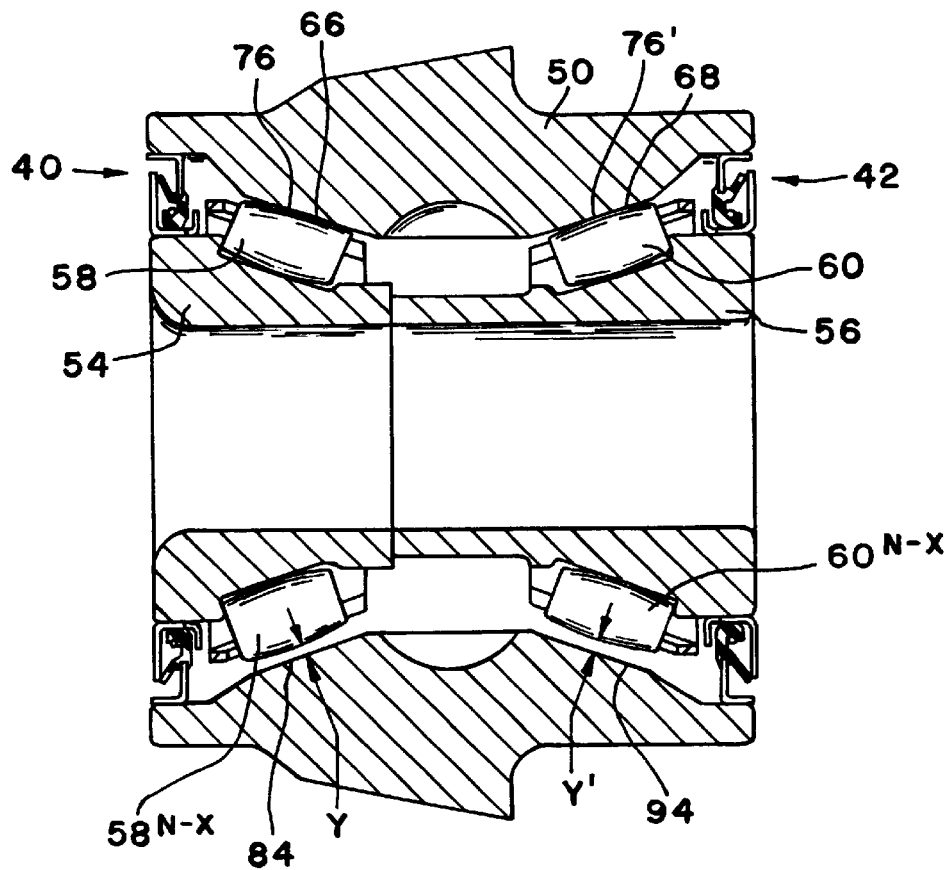
FIG. 3 is an enlarged sectional view of the bearing member of FIG. 1 with the built-in end play magnified to illustrate the invention.

The bearing assembly 20 is best illustrated in FIGS. 1, 2 and 3 and includes a unitary outer race 50 and an inner race 52 composed of first 54 and second 56 cones. The outer race 50 and inner race 52 retain a first plurality rollers 58,58', . . . 58" in a first row and second plurality rollers 60, 60' . . . 60" in a second row. The first and second rows are retained or aligned between the outer race 50 and the first 54 and second 56 cones by holders or cages 61,61'. The outer race 50 has a cylindrical outer surface 62 with a plurality of projections 63 and an inner surface 64 having first 66 and second 68 tapered or sloping raceways which extend from ledge surfaces 70 and 72 adjacent ends 69 and 71. As illustrated the first 66 and second 68 tapered or sloping raceways are symmetrically positioned with respect to a reference point 74 along the inner surface 64.

Each roller in the plurality of rollers 58,58', . . . 58" and 60,60', . . . 60" is identical and only a single roller 58 will be described in detail. Roller 58 essentially has cylindrical shape however a peripheral apex 76 of about 0.0005 mm is located between a first end 57 and a second end 59. The plurality of rollers are located in the cage or holder 61 to provide uniform spacing around the axle of a vehicle.

The first cone 54 has a first outer face 53 separated from a first inner face 55 by an outer peripheral surface 80 and an inner surface 82. The inner surface 82 which includes a tapered or sloping raceway 84 located between a ledge or thrust surface 86 and a guide surface 88. The tapered or sloping raceway 84 is designed to be parallel or complementary with the tapered or sloping raceway 66 in the unitary outer race 50. Similarly, the second cone member 56 has a second outer face 97 separated from a second inner face 99 by an outer peripheral surface 90 and an inner surface 92. The inner surface 92 which includes a tapered or sloping raceway 94 located between a ledge or thrust surface 96 and a guide surface 98. Seals 40,42 are respectively located between ledges 70,86 and 72,96 to complete the bearing member 20.

The end play for the first and second plurality of rollers 58,58', . . . 58" and 60,60', . . . 60" is determined by placing holder or cage 61 for the first plurality of rollers 58,58', . . . 58" in sloping raceway 84 of cone 54 and inserted the cone 54 into the inner surface 64 of the outer race 50 until the apex 76 on the plurality of 58,58', . . . 58" makes point contact with sloping raceway 66. Thereafter, cage 61' for the second plurality of rollers 60,60', . . . 60" is placed in raceway 94 cone 56 and the cone 56 is inserted into the inner surface 64 of the outer race 50 until the apex 76' on the plurality of 60,60', . . . 60" makes point contact with sloping raceway 68. The point contact between the apex 76 of the first plurality of rollers 58,58', . . . 58" with the first sloping raceway 66 and the point of contact between apex 76' of the second plurality of rollers 60,60', . . . 60" with the second sloping raceway 68 defines a first linear distance "L-1" while a distance between the first outer face 53 on the first cone 54 and the second outer face 97 on the second cone 56 defines a second linear distance "L-2". The second linear distance "L-2" is selected such that on engagement of the inner face 55 of the first cone 54 and inner face 99 of the second cone 56 an operational end play is created between the point of contact of apex 76,76' of the first and second plurality of rollers 58,58', . . . 58"; 60,60', . . . 60". Test have indicated that a set built-in end play for bearing member 20 which is equal to the first linear distance L-1 plus a linear dimension of between 0.015 mm and 0.070 mm will be acceptable for the present invention.

Method of Assembly

The wheel and bearing assembly 10 is assembled through the following steps. A bearing member 20 having a build-in desired end play for first and second plurality of rollers 58,58', . . . 58"; 60,60', . . . 60" is selected from a source. The bearing member 20 is located on a hub 16 with an outer face 53 of a first cone 54 engaging a first annular shoulder 116. Thereafter, the hub 16 is placed on an axle shaft 14 of the vehicle and outer face 97 of a second cone 56 is brought into engagement with a second shoulder 114. A nut 214 is threaded onto axle shaft 14 to compress the first and second cones 54,56 against shoulders 114,116 and correspondingly connects hub 16 to the axle shaft 14. The nut 214 is locked onto axle shaft 14 by a key 216 to assure that the proper retention force is maintained between the axle shaft 14 and hub 16. Thereafter, a plurality of bolts 65 pass through corresponding openings in projections 63 of the unitary outer race 50 of the bearing member 20 and engage a stationary member 21 to fix the bearing member 10 to the vehicle. Next, a rotor 16, having a first annular peripheral face 17 and a second annular peripheral face 19 is attached to hub 16 by wheel bolts 616, only one is shown. Finally, a caliper brake 18 is secured to a stationary frame of the vehicle to correspondingly align and establish predetermined equal running clearances x and x' between the first 22 and second 24 friction disc and the first 17 and second 19 peripheral faces on rotor 16.

Mode of Operation

When the wheel and bearing assembly 10 of the present invention is located on a vehicle with a wheel attached to hub 12, rotor 16 rotates in a plane wherein peripheral surfaces 17 and 19 are located adjacent corresponding faces 23 and 25 of the first 22 and second 24 friction pads with equal running clearances x and x'. The first and second plurality of rollers 58,58', . . . 58$^n$; 60,60', . . . 60$^n$ are positioned in the outer race 50 of bearing member 20 in a manner as illustrated in FIG. 3 with apex 76,76' for the first and second plurality of rollers 58,58', . . . 58$^n$; 60,60', . . . 60$^n$ correspondingly engaging the sloping raceways 66,68 at points an equal distance from reference point 74 and the end play is illustrated in an exaggerated manner as clearances y and y' between the first and second plurality of rollers 58,58', . . . 58$^{n-x}$; 60,60', . . . 60$^{n-x}$ and sloping raceways 84,94 on the first 54 and second 56 cones. The first and second plurality of rollers 58,58', . . . 58$^n$; 60,60', . . . 60$^n$ of bearing member 20 remain in this relationship as long as the vehicle is traveling in a horizontal and linear manner such that the running clearances x and x' between the rotor 16 and friction pads 22,24 remain in a fixed and static condition.

When a vehicle is traveling in a linear manner and encounters a curve in the roadway, centrifugal forces are generated. If the centrifugal forces are great enough, the vehicle will experience an outward or inward overturning moment with respect to a roadway. The centrifugal force is resisted by the engagement of the wheels with the roadway but because of the relationship between the components of the vehicle stresses are introduced into the components and since some components are more solidly retained some components deflect more than others.

Figure 4A:
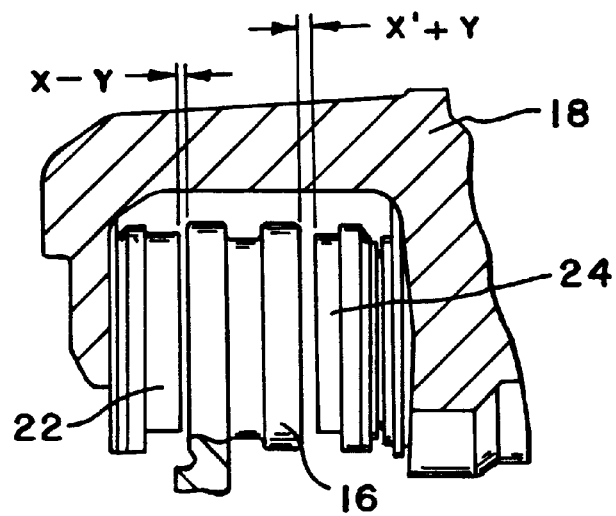
FIG. 4a is an enlarged sectional view which illustrates the resulting clearance between the rotor and friction pads as a result of the outward centrifugal forces acting on the wheel assembly as shown in FIG. 4.
Figure 4:
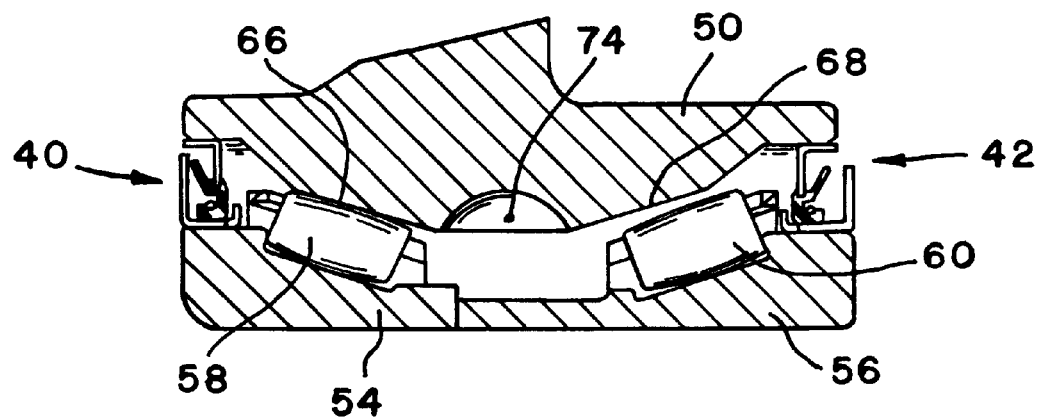
FIG. 4 is an enlarged sectional view of the bearing member of FIG. 1 illustrating the effect of outward centrifugal forces on the wheel assembly.
Figure 5A:
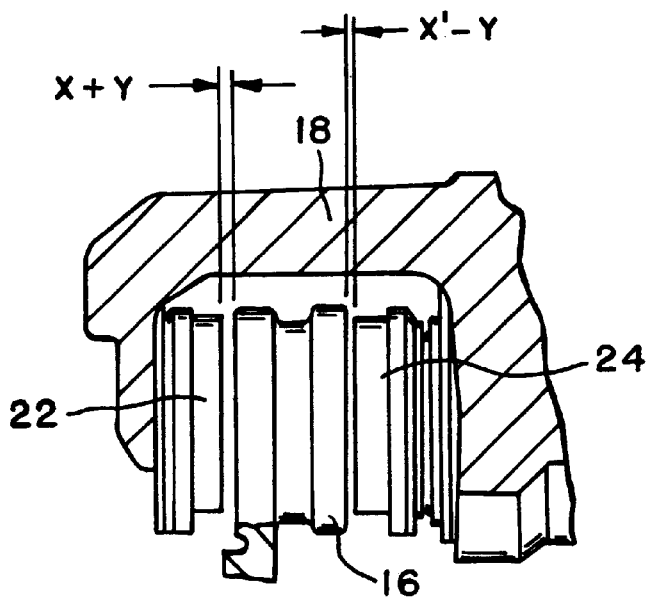
FIG. 5a is an enlarged sectional view which illustrates the resulting clearance between the rotor and friction pads as a result of the inward centrifugal forces acting on the wheel assembly as shown in FIG. 5.
Figure 5:
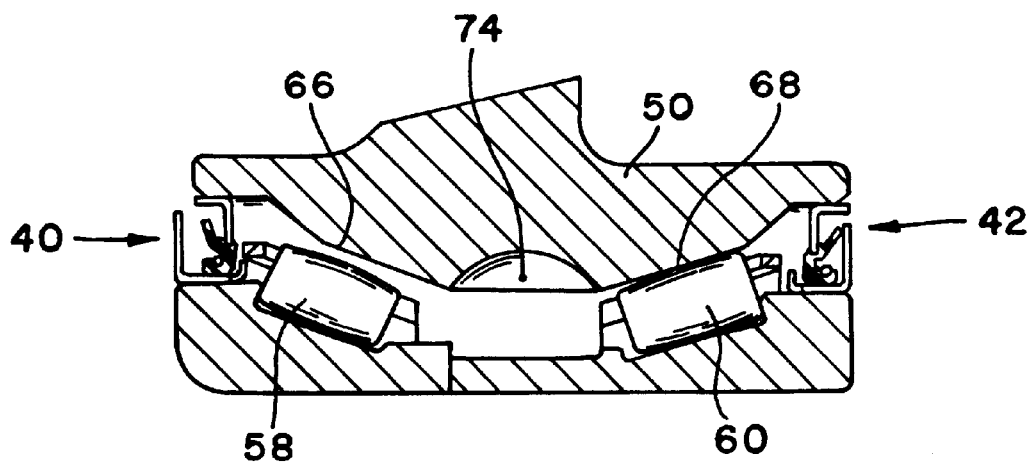
FIG. 5 is an enlarged sectional view of the bearing member of FIG. 1 illustrating the effect of inward centrifugal forces on the wheel assembly.

In a vehicle equip with the wheel and bearing assembly 10 of the present invention, the outer race 50 is fixed to the vehicle and as such remains stationary, however, the built-in end play of the bearing member 20 allows the first and second plurality of rollers 58,58', . . . 58$^n$; 60,60', . . . 60$^n$ to shift in the direction of the centrifugal forces. FIG. 4 illustrates a shift of cones 54,56 of the bearing member 20 when radial outward centrifugal forces are experienced by a vehicle and FIG. 4*a* illustrates the resulting running clearances x-y and x'+y while FIG. 5 illustrates a shift of cones 54,56 of the bearing member 20 when radial inwardly centrifugal forces are experienced by a vehicle and FIG. 5*a* illustrates the resulting running clearance x+y and x'-y as rotor surfaces 17 and 19 correspondingly move the friction pads 22 and 24. FIGS. 4 and 5 illustrate the effect of a wheel and bearing assembly 10 on opposite sides of a vehicle. The shift of the first and second plurality of rollers 58,58', . . . 58$^n$; 60,60', . . . 60$^n$, in raceways 66 and 68 is limited as movement only occurs until first and second plurality of rollers 58,58', . . . 58$^{n-x}$; 60,60', . . . 60$^{n-x}$ engage raceways 84,94. It should be understood that the axial shift of hub 12 is magnified by the rotor 16 such that corresponding surface 17 or 19 engages face 23 or 25 to move friction pads 22 or 24 to produce the running clearances which are increased or decreased by a magnitude referred to as "y" in FIGS. 4 and 5. When the centrifugal force terminates, the first and second plurality of rollers 58,58', . . . 58$^n$; 60,60', . . . 60$^n$ return to their centered positioned illustrated in FIG. 3 however, the running clearance between face 23 and surface 17 and face 25 and surface 19 will have changed as one running clearance will equal the desired running clearance plus the end play (x+y or x'+y) and the other running clearance will equal the desired running clearance less the end play (x-y or x'-y). Either way a minimum running clearance is achieved and as a result polishing of surfaces 17 and 19 is attenuated with the desired equal running clearance x,x' being reestablished on a next brake application.

I claim:

1. A method to attenuate the engagement of friction pads associated with a caliper of a brake for a vehicle during a non-brake application comprising the steps of:

selecting a bearing assembly from a source, said bearing assembly including a unitary outer race and an inner race having first and second cone members with a first plurality of rollers retained in a first row between said outer race and said first cone and a second plurality of rollers retained in a second row between said outer race and said second cone, said outer race having a first tapered raceway and a second tapered raceway symmetrically positioned with respect to a reference point along an inner surface, said each of said plurality of rollers having a substantially cylindrical shape with a peripheral apex located between a first end and a second end, said first cone member having an first outer face and a first inner face and said second cone member having a second outer face and a second inner face, said first inner face on engaging said second inner face positioning said peripheral apex on each of said rollers in point contact engagement with one of said first and second tapered raceways, said point contact between said apex of said first plurality of rollers with said first tapered raceway and said point of contact between said apex of the second plurality of rollers with said second tapered raceway defining a first linear distance while a distance between said first outer face on said first cone and said second outer face on said second cone defining a second linear distance, said second linear distance being selected such that an operational end play distance between the point contact of said apex of said first and second pluralities of roller is equal to said first linear distance plus a linear dimension of between 0.015 mm and 0.070 mm;

locating said first and second cone members on a hub of a wheel assembly with said first outer face of said first cone member engaging a first shoulder on said hub;

placing said hub on an axle shaft of said vehicle with said second outer face of said second cone member in engagement with a second shoulder on said axle shaft;

securing said wheel assembly to said axle to hold said first and second cone members against said first and second shoulders;

securing said unitary outer race of said bearing assembly to said vehicle;

attaching a rotor to said wheel assembly, said rotor having a first peripheral face and a second peripheral face; and securing a caliper brake to said vehicle to align first and second friction disc with said first and second peripheral faces on said rotor with a predetermined running clearance, said wheel assembly rotating during linear horizontal movement of said vehicle such that said first plurality of rollers engage said first tapered raceway and said second plurality of rollers engage the second tapered raceway symmetrically with respect to a reference point such that said rotor is located in a radial plane with respect to said first and second friction disc to define said running clearance, said wheel assembly being subject to axial forces on radial horizontal movement of said vehicle such that said first and second plurality of rollers shift engagement along said first and second tapered raceways a distance corresponding to said end play and said rotor correspondingly moves in to engage one of said friction disc such on termination of said radial forces and a return to horizontal linear movement of the vehicle a minimum running clearance is assured until a brake application reestablishes said predetermined running clearance.

2. A wheel assembly and caliper brake for a vehicle to attenuate the engagement of friction pads associated with the caliper brake during a non-brake application comprising:

a bearing assembly including a unitary outer race and an inner race, said inner race having first and second cone members, a first plurality of rollers retained in a first row between said outer race and said first cone and a second plurality of rollers retained in a second row between said outer race and said second cone, said outer race having a first tapered raceway and a second tapered raceway extending from a reference point along an inner surface, said each of said plurality of rollers having a substantially cylindrical shape with a peripheral apex located between a first end and a second end, said first cone member having an first outer face and a first inner face and said second cone member having a second outer face and a second inner face, said first inner face engaging said second inner face for positioning the peripheral apex on each of said rollers in point contact engagement with one of said first and second tapered raceways, said point contact between said apex of said first plurality of rollers with said first tapered raceway and said point of contact between said apex of said second plurality of rollers with said second tapered raceway defining a first linear distance while a distance between said first outer face on said first cone and said second outer face on said second cone defining a second linear distance, said second linear distance being selected such that an operational end play distance between the point contact of said apex of said first and second pluralities of rollers is equal to said first linear distance plus a linear dimension of between 0.015 mm and 0.070 mm;

a hub for a wheel assembly, said hub receiving said first cone member until said first outer face engages a first shoulder on said hub;

an axle shaft of said vehicle for receiving said hub until said second outer face of said second cone member engages a second shoulder on said axle shaft;

first fastener means for securing said wheel assembly to said axle shaft to hold said first and second cone members against said first and second shoulders;

second fastener means for securing said unitary outer race of said bearing assembly to said vehicle;

a rotor attached to said wheel assembly, said rotor having a first peripheral face and a second peripheral face; and a caliper brake attached to said vehicle to align first and second friction disc with said first and second peripheral faces on said rotor with a predetermined running clearance, said wheel assembly rotating during linear horizontal movement of said vehicle such that said first plurality of rollers engage said first tapered raceway and said second plurality of rollers engage said second tapered raceway symmetrically with respect to a reference point such that said rotor is located in a radial plane with respect to said first and second friction disc to define a desired running clearance, said wheel assembly on being subject to axial forces on radial horizontal movement of said vehicle such that said first and second plurality of rollers shift engagement with said first and second tapered raceways a distance corresponding to said end play and said rotor correspondingly moves in to engage one of said friction disc such that on termination of said radial forces and a return to horizontal linear movement of the vehicle a minimum running clearance is assured until a brake application reestablishes said predetermined running clearance.

3. The wheel and caliper brake assembly as recited in claim 2 wherein said minimum running clearance prevents engagement between said rotor and first and second friction pads which may create polishing of said first and second peripheral surfaces on the rotor.

* * * * *